United States Patent
You et al.

(10) Patent No.: US 10,015,662 B2
(45) Date of Patent: Jul. 3, 2018

(54) DISCOVERY SIGNAL RECEIVING METHOD AND TERMINAL

(71) Applicant: LG ELECTRONICS INC., Seoul (KR)

(72) Inventors: Hyangsun You, Seoul (KR); Yunjung Yi, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/121,476

(22) PCT Filed: Mar. 2, 2015

(86) PCT No.: PCT/KR2015/001991
§ 371 (c)(1),
(2) Date: Aug. 25, 2016

(87) PCT Pub. No.: WO2015/137655
PCT Pub. Date: Sep. 17, 2015

(65) Prior Publication Data
US 2016/0366576 A1     Dec. 15, 2016

Related U.S. Application Data

(60) Provisional application No. 61/952,119, filed on Mar. 12, 2014.

(51) Int. Cl.
*H04W 8/00*     (2009.01)
*H04J 11/00*    (2006.01)
(Continued)

(52) U.S. Cl.
CPC ......... *H04W 8/005* (2013.01); *H04J 11/0069* (2013.01); *H04L 5/005* (2013.01); *H04W 72/042* (2013.01); *H04W 48/12* (2013.01)

(58) Field of Classification Search
CPC ........... H04W 72/042; H04W 72/0446; H04W 8/005; H04L 5/0048
See application file for complete search history.

(56) References Cited

U.S. PATENT DOCUMENTS

| | | | |
|---|---|---|---|
| 2012/0307778 A1* | 12/2012 | Nishio | H04L 1/0047 370/329 |
| 2013/0121317 A1* | 5/2013 | Lee | H04L 5/0042 370/336 |
| 2013/0142062 A1* | 6/2013 | Dinan | H04W 24/00 370/252 |

FOREIGN PATENT DOCUMENTS

WO     2013055094 A2     4/2013

OTHER PUBLICATIONS

"Small Cell Discovery," Motorola Mobility, R1-121519, 3GPP TSG RAN WG1 #72bis, Apr. 15-19, 2013.*
(Continued)

*Primary Examiner* — Jamal Javaid
(74) *Attorney, Agent, or Firm* — Lee Hong Degerman Kang Waimey

(57) ABSTRACT

One disclosure of the present invention provides a discovery signal receiving method. The method may comprise the steps of: identifying, through a physical control format indicator channel (PCFICH) received from a small-scale cell over a first orthogonal frequency division multiplexing (OFDM) symbol of a downlink sub-frame, the position of an OFDM symbol over which a downlink control channel is received; and determining a resource region on which a discovery signal is received from the small-scale cell. In the determining step, it can be assumed that the resource region on which the discovery signal is received does not overlap a resource region on the OFDM symbol over which the downlink control channel is received.

6 Claims, 16 Drawing Sheets

(51) Int. Cl.
*H04W 72/04* (2009.01)
*H04L 5/00* (2006.01)
*H04W 48/12* (2009.01)

(56) References Cited

OTHER PUBLICATIONS

Motorola Mobility, "Small cell discovery", 3GPP TSG RAN WG1 #72bis, R1-131519, Apr. 6, 2013, 2 Pages.
ETRI, "Dicussion on small-cell discovery", 3GPP TSG RAN WG1 Meeting #72bis, R1-131141, Apr. 6, 2013, 3 Pages.
CATT, "Further discussion on resource allocation for D2D discovery", 3GPP TSG RAN WG1 Meeting #76, R1-140098, Jan. 31, 2014, 9 Pages.

* cited by examiner

Antenna 0

DISCOVERY SIGNAL RECEIVING METHOD AND TERMINAL

CROSS-REFERENCE TO RELATED APPLICATIONS

This application is the National Stage filing under 35 U.S.C. 371 of International Application No. PCT/KR2015/001991, filed on Mar. 2, 2015, which claims the benefit of U.S. Provisional Application No. 61/952,119, filed on Mar. 12, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell of which a cell coverage radius is small is added in the coverage of a legacy cell and that the small cell handles a greater amount of traffic.

However, when small cells are disposed densely in the coverage of a macro cell, it may be difficult to detect the small cells within a short time.

SUMMARY OF THE INVENTION

Accordingly, an object of the present invention is to solve the above-mentioned problems.

In order to achieve the aforementioned purpose, one disclosure of the present specification provides a method of receiving a discovery signal. The method may comprise: checking, through a physical control format indicator channel (PCFICH) received from a small on a first orthogonal frequency division multiplexing (OFDM) symbol of a downlink subframe, a location of an OFDM symbol on which a downlink control channel is received; and determining a resource region in which the discovery signal is received from the small cell. In the determining, it may be assumed that the resource region in which the discovery signal is received does not overlap with a resource region on the OFDM symbol on which the downlink control channel is received.

In the determining, the downlink control channel may be punctured on the resource region so that the resource region in which the discovery signal is received does not overlap with the resource region on the OFDM symbol on which the downlink control channel is received.

In the determining, if the resource region in which the discovery signal is received is present in an overlapping manner on the OFDM symbol confirmed through the PCFICH, it may be assumed that the confirmation achieved through the PCFICH has an error.

In the determining, if the resource region in which the discovery signal is received overlaps with the resource region on the OFDM symbol in which the downlink control channel is received, the discovery signal may not be received in practice.

The discovery signal may contain a primary synchronization signal (PSS) and a secondary synchronization signal (SSS).

In order to achieve the aforementioned purpose, one disclosure of the present specification provides a terminal for receiving a discovery signal. The terminal may comprise: a processor for checking, through a physical control format indicator channel (PCFICH) received from a small on a first orthogonal frequency division multiplexing (OFDM) symbol of a downlink subframe, a location of an OFDM symbol on which a downlink control channel is received, and for determining a resource region in which the discovery signal is received from the small cell. When the processor performs the determining, it may be assumed that the resource region in which the discovery signal is received does not overlap with a resource region on the OFDM symbol on which the downlink control channel is received.

According to a disclosure of the present specification, the aforementioned problem of the conventional technique can be solved.

DESCRIPTION OF EXEMPLARY EMBODIMENTS

Figure 1:
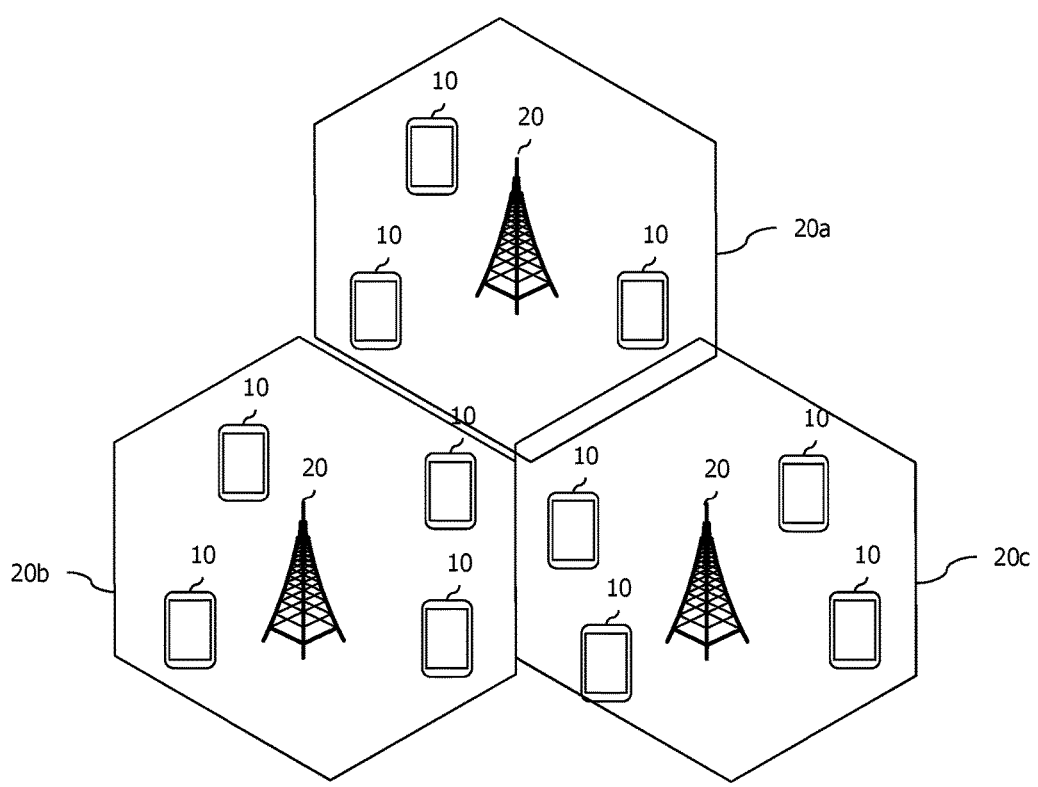
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
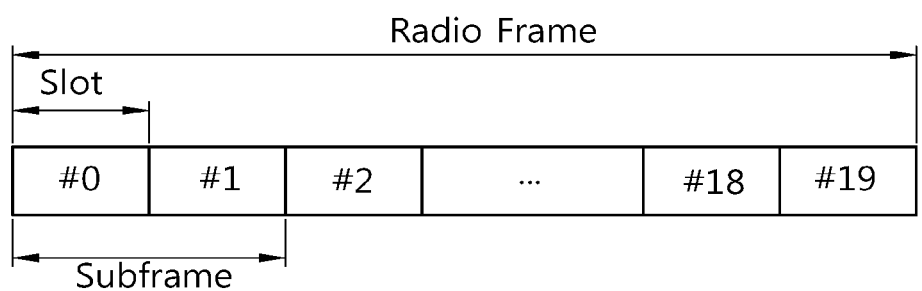
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
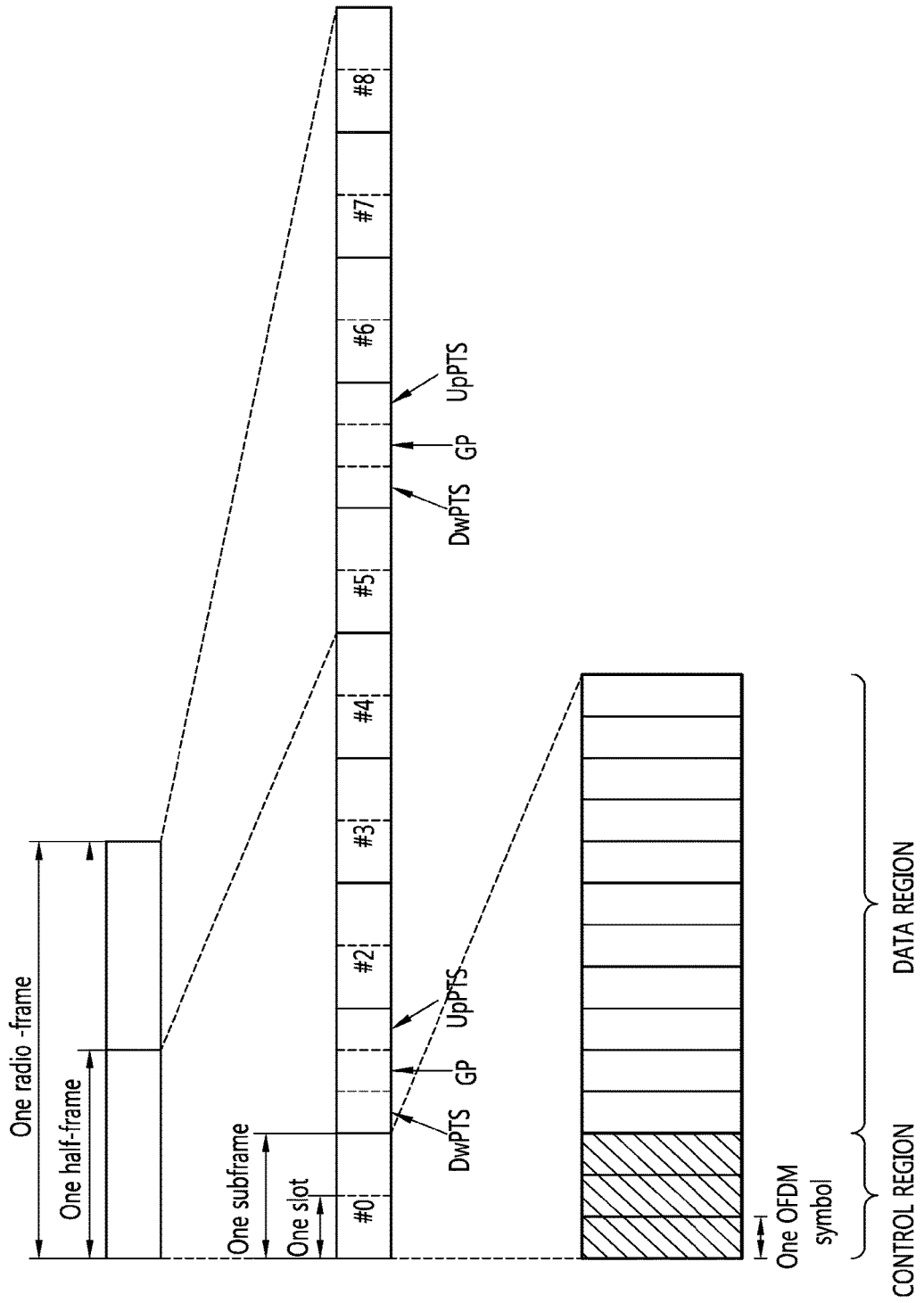
FIG. 3 illustrates a structure of a downlink radio frame according to TDD in the 3GPP LTE.

FIG. 3 Illustrates the Architecture of a Downlink Radio Frame According to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

Figure 4:
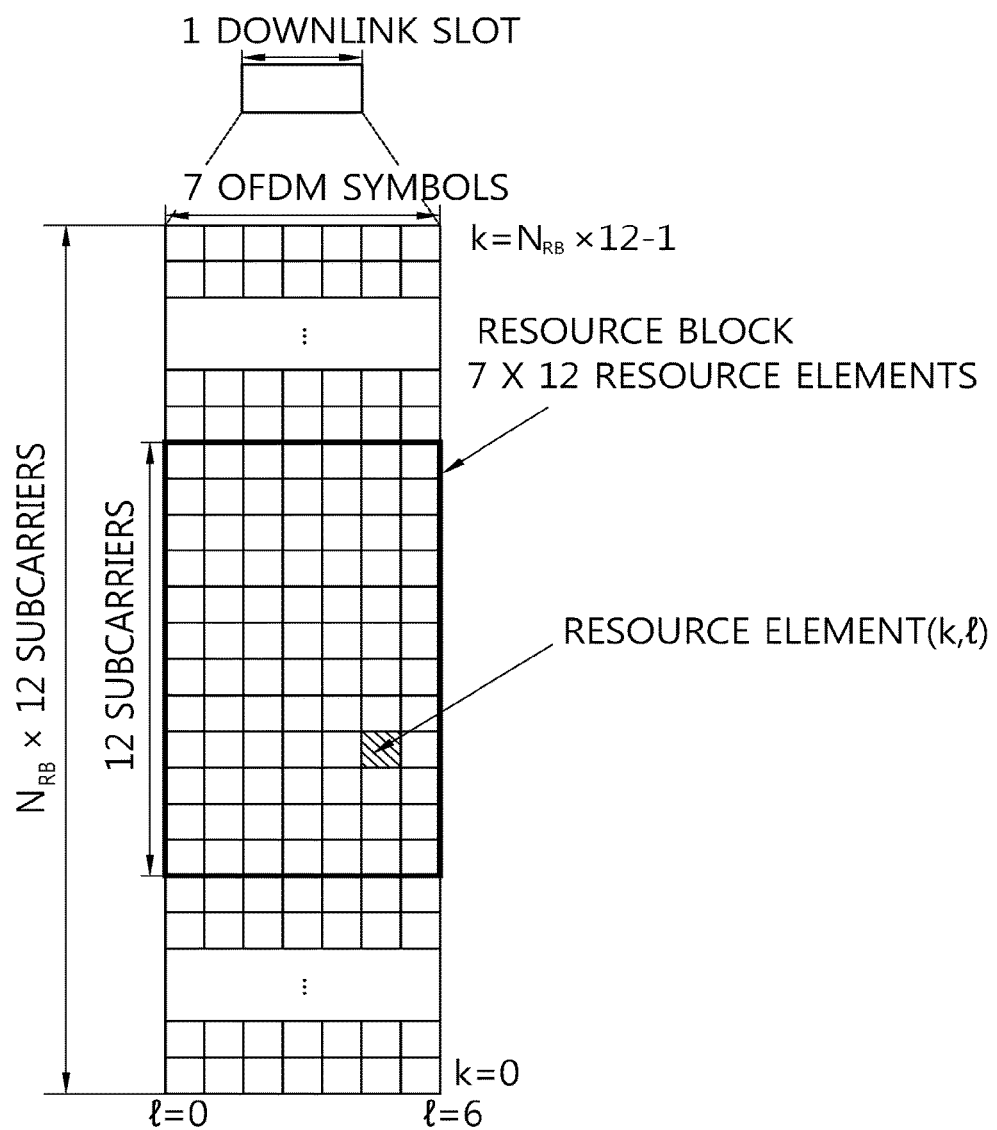
FIG. 4 is an exemplary diagram illustrating a resource grid for one uplink or downlink slot in the 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
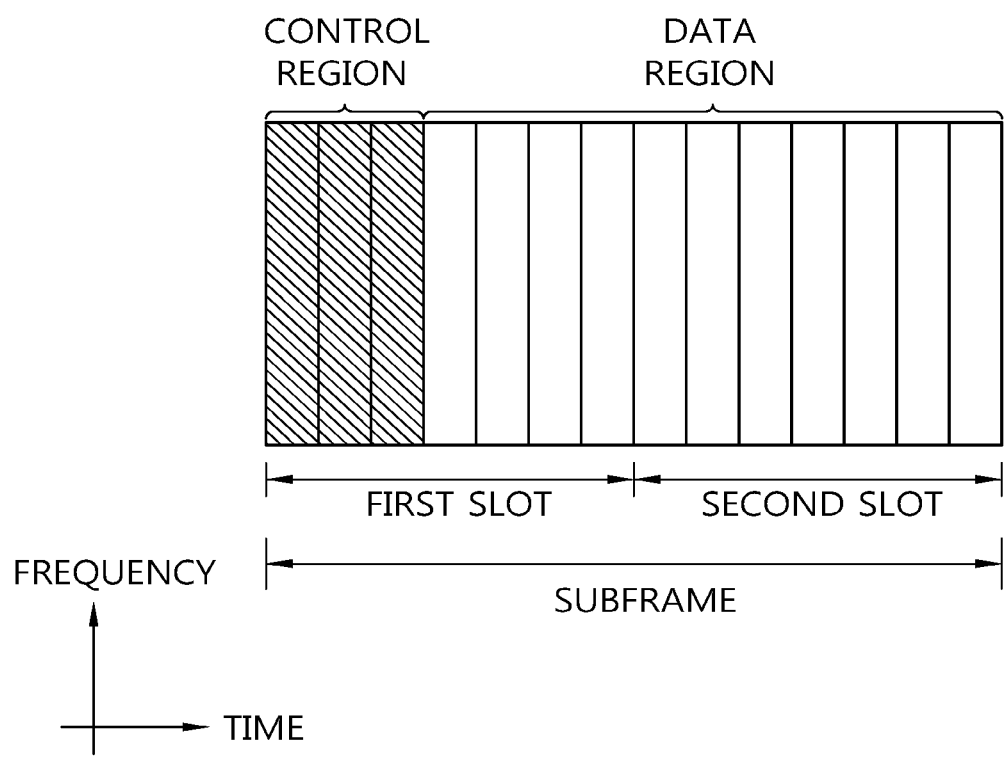
FIG. 5 illustrates a structure of a downlink subframe.

FIG. 5 Illustrates the Architecture of a Downlink Sub-Frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
|  | DCI format 1 | Terminal specific | Single antenna port, port 0 |
| Transmission mode 2 | DCI format 1A | Public service and terminal specific | Transmit diversity |
|  | DCI format 1 | Terminal specific | Transmit diversity |
| Transmission mode 3 | DCI format 1A | Public service and terminal specific | Transmit diversity |
|  | DCI format 2A | Terminal specific | CDD(Cyclic Delay Diversity) or transmit diversity |
| Transmission mode 4 | DCI format 1A | Public service and terminal specific | Transmit diversity |
|  | DCI format 2 | Terminal specific | Closed-loop spatial multiplexing |
| Transmission mode 5 | DCI format 1A | Public service and terminal specific | Transmit diversity |
|  | DCI format 1D | Terminal specific | MU-MIMO(Multi-user Multiple Input Multiple Output) |
| Transmission mode 6 | DCI format 1A | Public service and terminal specific | Transmit diversity |
|  | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
|  | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
|  | DCI format 2B | Terminal specific | Dual layer transmisison (port 7 or 8), or single antenna port, port 7 or 8 |

TABLE 3-continued

| Transmission mode | DCI format | Search space | Transmission mode of PDSCH according to PDCCH |
|---|---|---|---|
| Transmission mode 9 | DCI format 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

Figure 6:
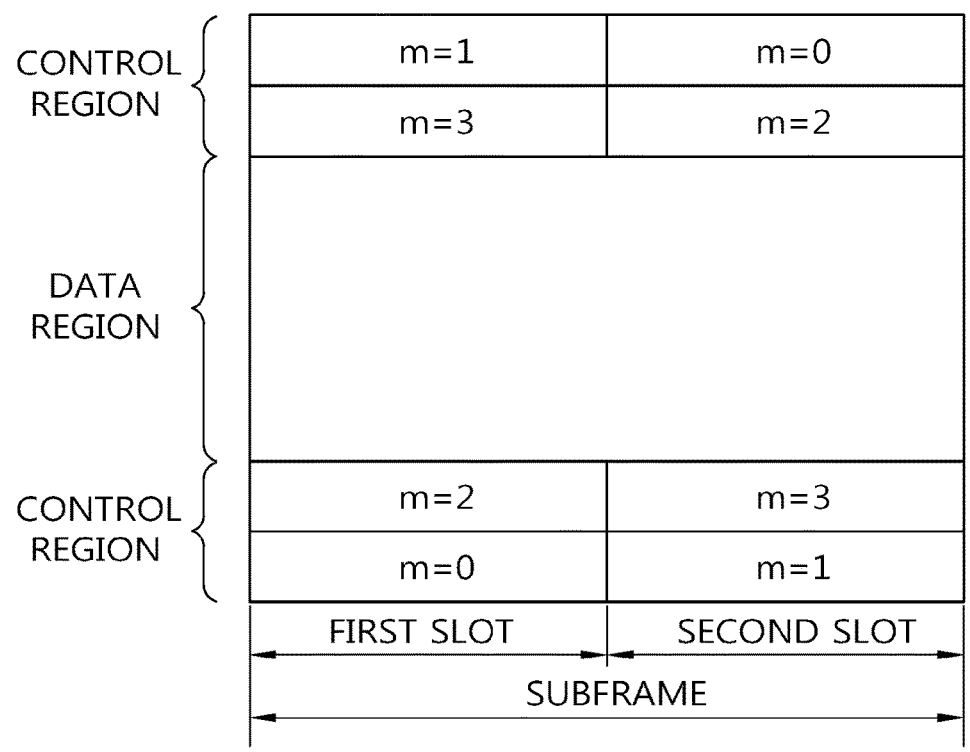
FIG. 6. illustrates a structure of an uplink subframe in 3GPP LTE.
Figure 6:
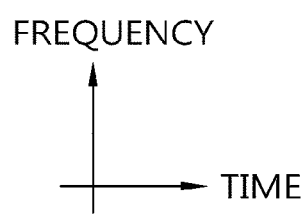

FIG. 6. Illustrates a Structure of an Uplink Subframe in 3GPP LTE.

Referring to FIG. 6, an uplink subframe may be divided into a control region and a data region in a frequency domain. The control region is allocated a PUCCH for transmission of uplink control information. The data region is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

<Carrier Aggregation>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Synchronization Signal>

Meanwhile, synchronization with a cell is achieved in an LTE/LTE-A system through a synchronization signal (SS) in a cell search procedure.

Hereinafter, the SS will be described in greater detail with reference to the accompanying drawings.

Figure 7:
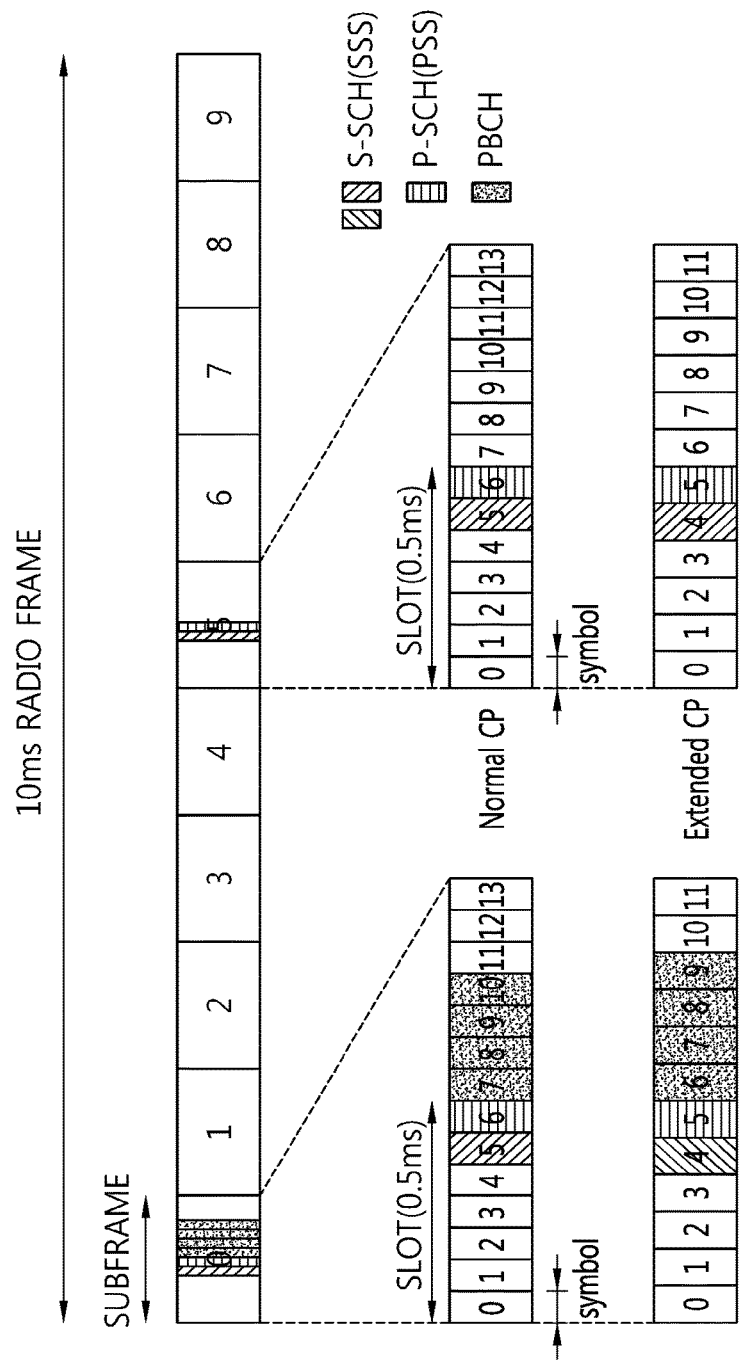
FIG. 7 illustrates a frame structure for transmitting a synchronization signal in the conventional FDD frame.

FIG. 7 Illustrates a Frame Structure for Transmitting a Synchronization Signal in the Conventional FDD Frame.

A slot number and a subframe number start from 0. A UE may adjust time and frequency synchronizations on the basis of a synchronization signal received from a BS. A synchronization signal of 3GPP LTE-A is used for cell search, and may be classified into a primary synchronization signal (PSS) and a secondary synchronization signal (SSS). The synchronization signal of 3GPP LTE-A may be found in the section 6.11 of 3GPP TS V10.2.0 (2011-06).

The PSS is used to obtain an OFDM symbol synchronization or a slot synchronization, and is associated with a physical-layer cell identity (ID) (or PCI). Further, the SSS is used to obtain a frame synchronization. In addition, the SSS is used to detect a CP length and to obtain a physical-layer cell group ID.

The synchronization signal can be transmitted in each of subframes #0 and #5 by considering a global system for mobile communication (GSM) frame length of 4.6 ms to facilitate inter-radio access technology (RAT) measurement. A boundary for the frame can be detected through the SSS. More specifically, in the FDD system, the PSS is transmitted in a last OFDM symbol of $0^{th}$ and $10^{th}$ slots, and the SSS is transmitted in an immediately previous OFDM symbol of the PSS.

The synchronization signal can transmit 504 physical cell IDs by combining 3 PSSs and 168 SSSs. A physical broadcast channel (PBCH) is transmitted in first 4 OFDM symbols of a $1^{st}$ slot. The synchronization signal and the PBCH are transmitted within 6 RBs in a system bandwidth, so as to be detected or decoded by a UE irrespective of a transmission bandwidth. A physical channel for transmitting the PSS is called a P-SCH, and a physical channel for transmitting the SSS is called an S-SCH.

Figure 8:
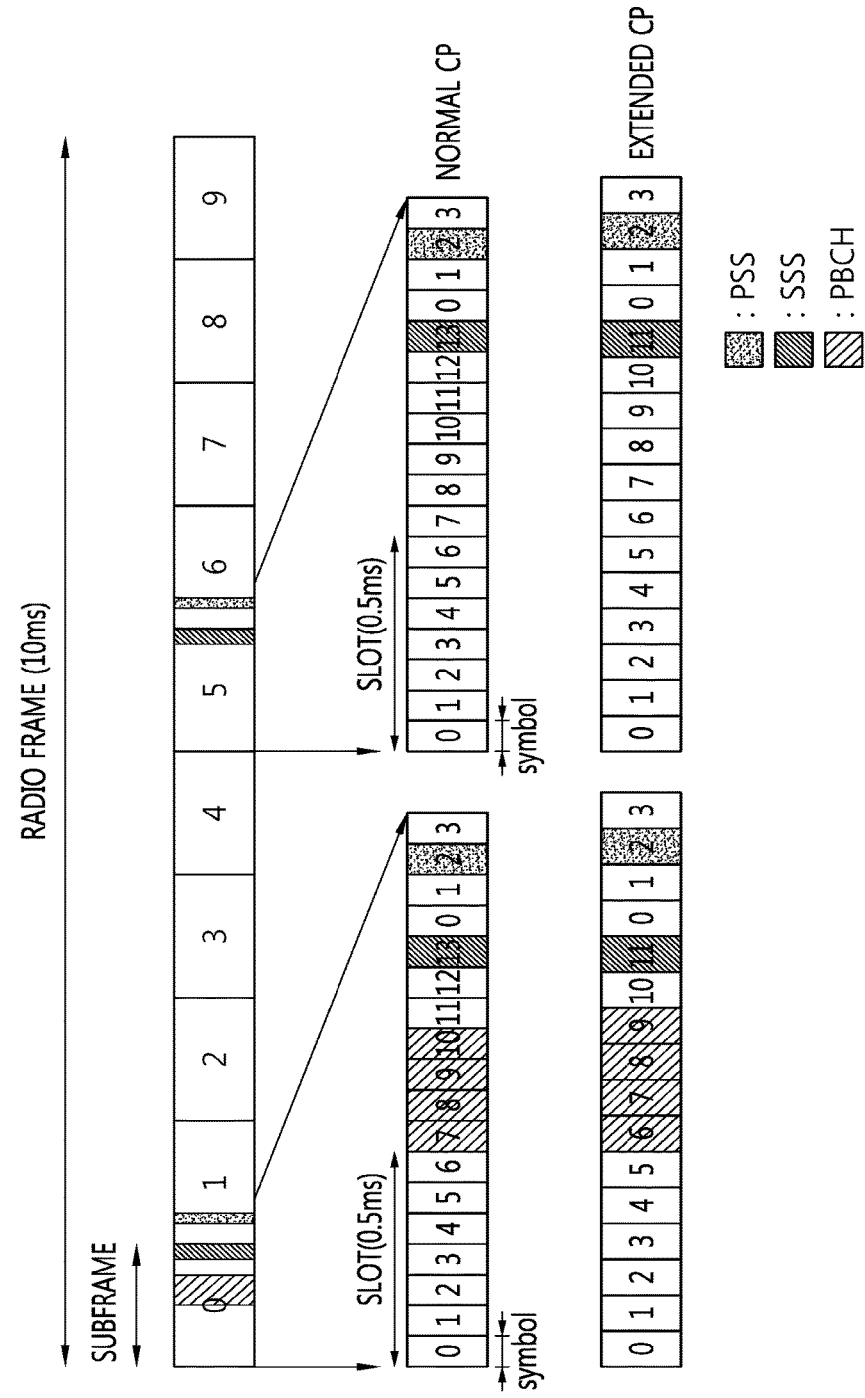
FIG. 8 illustrates a frame structure for transmitting a synchronization signal in a TDD frame.

FIG. 8 Illustrates a Frame Structure for Transmitting a Synchronization Signal in a TDD Frame.

In the TDD frame, a PSS is transmitted in a $3^{rd}$ OFDM symbol of $3^{rd}$ and $13^{th}$ slots. An SSS is transmitted three OFDM symbols earlier than the OFDM symbol in which the PSS is transmitted. A PBCH is transmitted in first 4 OFDM symbols of a $2^{nd}$ slot of a $1^{st}$ subframe.

<Reference Signal>

Meanwhile, a reference signal (RS) will be described hereinafter.

In general, transmission information (e.g., data) is easily distorted and modified while it is transmitted through a radio channel. Therefore, a reference signal (RS) is necessary to demodulate the transmission information in an error-free manner. The RS is a signal pre-known between the transmitter and the receiver and is transmitted together with the transmission information. Since the transmission information transmitted from the transmitter experiences a corresponding channel for each Tx antenna or for each layer, the RS may be allocated for each Tx antenna or for each layer. The RS for each Tx antenna or for each layer may be identified by using a resource (e.g., time, frequency, code, etc.). The RS may be used for two purposes, i.e., transmission information demodulation and channel estimation.

A downlink reference signal (RS) can be classified into a cell-specific RS (CRS), a Multimedia Broadcast and multicast Single Frequency Network (MBSFN) RS, a UE-specific RS (URS), a positioning RS (PRS), and a channel state information (CSI) RS (CSI-RS). As a reference signal to be transmitted to all UEs in a cell, the CRS is also called a common reference signal. The CRS can be used in channel measurement for a CQI feedback and in channel estimation for a PDSCH. The MBSFN RS can be transmitted in a subframe allocated for MBSFN transmission. The URS is an RS received by a specific UE or a specific UE group in the cell, and can also be called a demodulation RS (DM-RS). The DM-RS is primarily used in data demodulation of a specific UE or a specific UE group. The PRS may be used for location estimation of the UE. The CSI-RS is used in channel estimation for a PDSCH of an LTE-A UE. The CRI-RS is relatively sparsely arranged in a frequency domain or a time domain. The CSI-RS can be punctured in a data region of a normal subframe or an MBSFN subframe.

Figure 9:
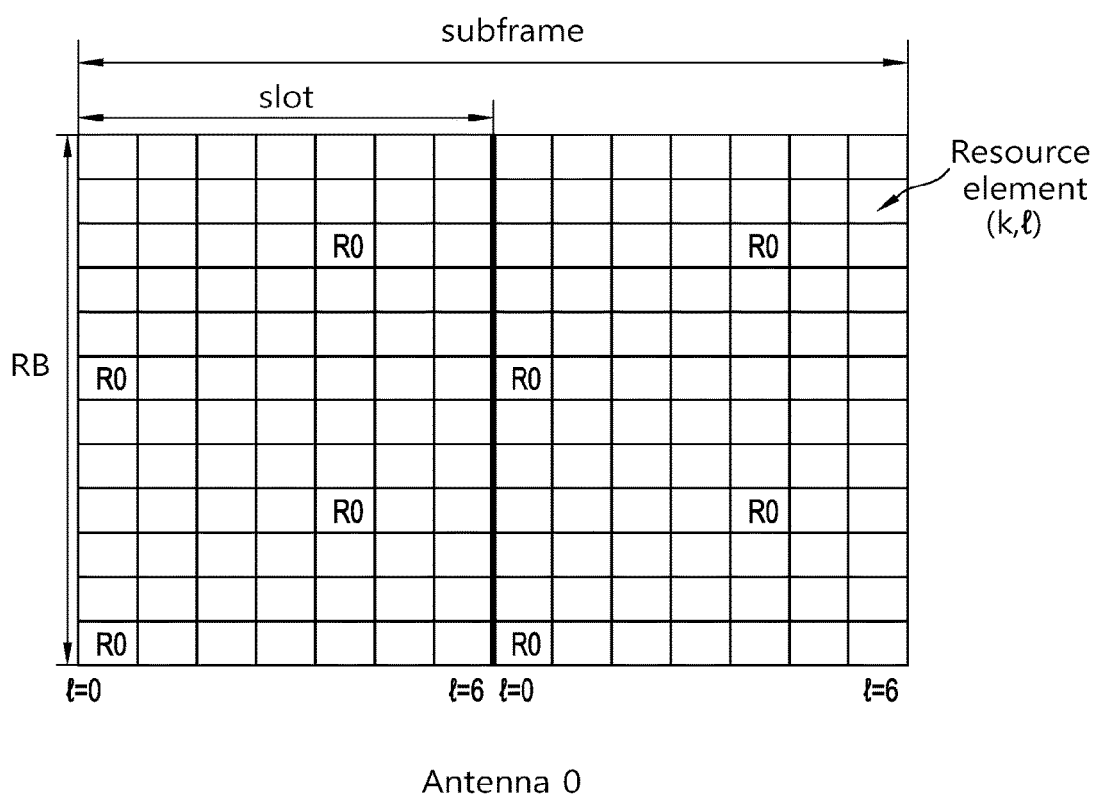
FIG. 9 illustrates an example of a pattern in which a cell-specific reference signal (CRS) is mapped to a resource block (RB) when a base station (BS) uses one antenna port.

FIG. 9 Illustrates an Example of a Pattern in which a CRS is Mapped to an RB when a BS Uses One Antenna Port.

Referring to FIG. 9, R0 denotes an RE to which a CRS transmitted using an antenna port number 0 of a BS is mapped.

The CRS is transmitted in all downlink subframes in a cell which supports a PDSCH transmission. The CRS may be transmitted on antenna ports 0 to 3. The CRS may be defined only for $\Delta f=15$ kHz. A pseudo-random sequence $r_{l,n_s}(m)$ generated from a seed value based on a cell identity (ID) is subjected to resource mapping to a complex-valued modulation symbol $a^{(p)}_{k,l}$. Herein, $n_s$ denotes a slot number in one radio frame, p denotes an antenna port, and l denotes an OFDM symbol number in a slot. k denotes a subcarrier index. l and k are expressed by the following equation.

$$k = 6m + (v + v_{shift}) \bmod 6 \quad \text{[Equation 1]}$$

$$l = \begin{cases} 0, N^{DL}_{symb} - 3 & \text{if } p \in \{0, 1\} \\ 1 & \text{if } p \in \{2, 3\} \end{cases}$$

$$v_{shift} = N^{cell}_{ID} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In the above equation, p denotes an antenna port, and $n_s$ denotes a slot number 0 or 1.

k has 6 shifted indices according to a cell ID ($N^{Cell}_{ID}$). Accordingly, cells having cell IDs 0, 6, 12, etc., which are a multiple of 6, transmit a CRS in the same subframe location k.

In the above equation, l is determined according to the antenna port p, and a possible value for l is 0, 4, 7, 11. Accordingly, the CRS is transmitted on symbols 0, 4, 7, and 11.

A resource element (RE) allocated to a CRS of one antenna port cannot be used in a transmission of another antenna port, and must be set to zero. Further, in a multicast-broadcast single frequency network (MBSFN) subframe, the CRS is transmitted only in a non-MBSFN region.

Figure 10:
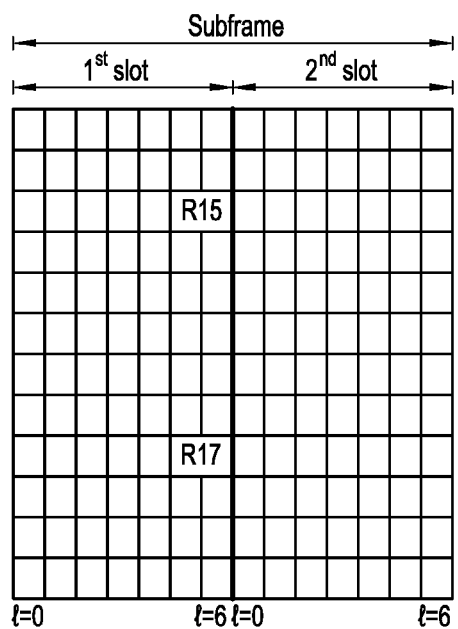
FIG. 10 illustrates an example of an RB to which a channel state information (CSI)-reference signal (RS) is mapped among reference signals.
Figure 10:
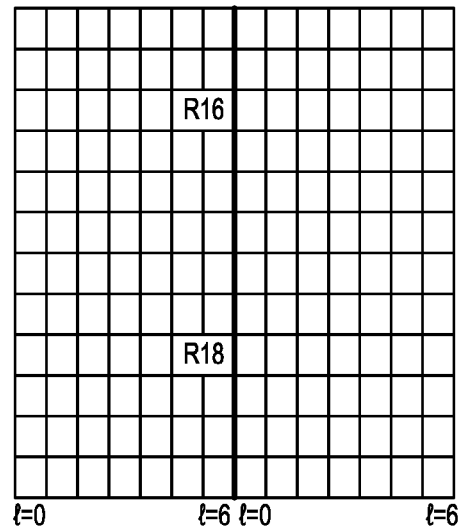
Figure 10:
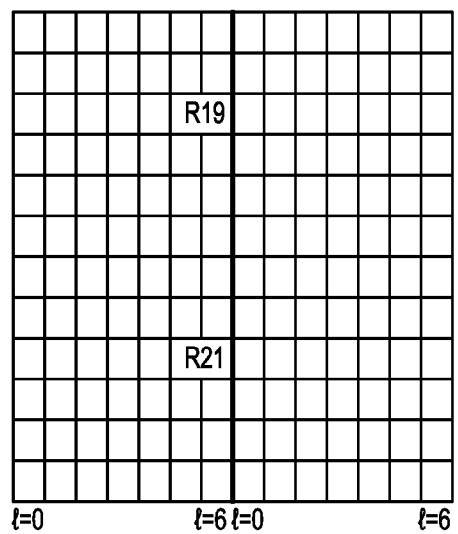

FIG. 10 Illustrates an Example of an RB to which a CSI-RS is Mapped Among Reference Signals.

The CSI-RS is used in channel estimation for a PDSCH of an LTE-A UE and channel measurement for generating channel information. The CRI-RS is relatively sparsely arranged in a frequency domain or a time domain. The CSI-RS can be punctured in a data region of a normal subframe or an MBSFN subframe. Optionally, CQI, PMI, RI, or the like may be reported from the UE through CSI estimation.

The CRI-RS is transmitted through 1, 2, 4, or 8 antenna ports. The antenna ports used in this case are respectively p=15, p=15, 16, p=15, . . . , 18, and p=15, . . . , 22. That is, the CSI-RS may be transmitted through 1, 2, 4, and 8 antenna ports. The CSI-RS may be defined only for $\Delta f = 15$ kHz. The CSI-RS may be found in the section 6.10.5 of 3GPP (3rd Generation Partnership Project) TS 36.211 V10.1.0 (2011-03) "Technical Specification Group Radio Access Network; Evolved Universal Terrestrial Radio Access (E-UTRA); Physical channels and modulation (Release 8)".

In CSI-RS transmission, up to 32 different configurations may be proposed to decrease an inter-cell interference (ICI) in a multi-cell environment including a heterogeneous network (HetNet) environment. A CSI-RS configuration differs depending on a CP and the number of antenna ports in a cell, and neighboring cells may have different configurations to the maximum extent possible. In addition, according to a frame structure, the CSI-RS configuration may be divided into a case of applying to both a frequency division duplex (FDD) frame and a time division duplex (TDD) frame and a case of applying only to the TDD frame. A plurality of CSI-RS configurations may be used in one cell. Zero or one CSI configuration may be used for a UE which assumes non-zero transmit power, and zero or multiple CSI configurations may be used for a UE which assumes zero transmit power.

The CSI-RS configurations may be indicated by a higher layer. For example, a CSI-RS-Config IE (information element) transmitted through a higher layer may indicate a CSI-RS configuration. The table below shows an example of CSI-RS-Config IE.

TABLE 5

```
CSI-RS-Config-r10 ::=        SEQUENCE {
csi-RS-r10                    CHOICE {
release                       NULL,
setup                         SEQUENCE {
antennaPortsCount-r10          ENUMERATED {an1, an2, an4, an8},
resourceConfig-r10             INTEGER (0..31),
subframeConfig-r10             INTEGER (0..154),
p-C-r10                        INTEGER (-8..15)
}
}                                                OPTIONAL,   -- Need ON
zeroTxPowerCSI-RS-r10         CHOICE {
release                       NULL,
setup                         SEQUENCE {
zeroTxPowerResourceConfigList-r10  BIT STRING (SIZE (16)),
zeroTxPowerSubframeConfig-r10       INTEGER (0..154)
}
}                                                OPTIONAL    -- Need ON
}
-- ASN1STOP
```

Referring to the table above, the 'antennaPortsCount' field indicates the number of antenna ports used for transmission of a CSI-RS. The 'resourceConfig' field indicates a CSI-RS configuration. The 'SubframeConfig' field and the 'zeroTxPowerSubframeConfig' field indicate subframe configurations where a CSI-RS is transmitted.

The 'zeroTxPowerResourceConfigList' field indicates a zero-power CSI-RS configuration. The CSI-RS configurations corresponding to bits set to 1 in the bitmap of 16 bits constituting the 'zeroTxPowerResourceConfigList' field may be set as zero-power CSI-RSs.

A sequence $r_{l,n_s}(m)$ for CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad [\text{Equation 2}]$$

$$m = 0, \ldots, N_{RB}^{max,DL} - 1$$

where, $c_{init} =$ $$2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In the above equation, $n_s$ is a slot number in the radio frame, and l is an OFDM symbol number in the slot. c(i) is a pseudo random sequence and is started at each OFDM symbol with $c_{init}$ indicated in Equation 1. $N_{ID}^{cell}$ means a physical cell ID.

In subframes configured to transmit CSI-RSs, the reference signal sequence $r_{l,n_s}(m)$ is mapped to a complex value modulation symbol $a_{k,l}^{(p)}$ used as a reference symbol for antenna port p.

$r_{l,n_s}(m)$ and $a_{k,l}^{(p)}$ are related by the following equation.

$$a_{k,l}^{(p)} = w_{l''} \cdot r(m) \quad [\text{Equation 3}]$$

where $k = k' + 12m +$ $$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & CSI \text{ reference signal configurations } 0\text{-}19, \\ & \text{normal cyclic prefix} \\ 2l'' & CSI \text{ reference signal configurations } 20\text{-}31, \\ & \text{normal cyclic prefix} \\ l'' & CSI \text{ reference signal configurations } 0\text{-}27, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the above equation, (k', l') and $n_s$ are given in Tables 6 and 7 described below. A CSI-RS may be transmitted in a downlink slot where ($n_s$ mod 2) meets the conditions in Tables 6 and 7 to be described below (where, 'mod' means modular computation. That is, ($n_s$ mod 2) means the remainder obtained by dividing $n_s$ by 2).

Table 6 represents a CSI-RS configuration in normal CP, and Table 7 represents a CSI-RS configuration in extended CP.

TABLE 6

| | CSI-RS Configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 7

| | CSI-RS Configuration index | Number of configured CSI-RSs | | | | | |
|---|---|---|---|---|---|---|---|
| | | 1 or 2 | | 4 | | 8 | |
| | | (k', l') | ns mod 2 | (k', l') | ns mod 2 | (k', l') | ns mod 2 |
| TDD and FDD frame | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |

TABLE 7-continued

| CSI-RS Configuration index | Number of configured CSI-RSs | | | | | |
|---|---|---|---|---|---|---|
| | 1 or 2 | | 4 | | 8 | |
| | (k', l') | ns mod 2 | (k', l') | ns mod 2 | (k', l') | ns mod 2 |
| TDD frame 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

The UE may transmit CSI-RSs only in the downlink slot meeting the condition of $n_s$ mod 2 in the above two tables. Further, the UE abstains from transmitting CSI-RSs in a special subframe of a TDD frame, a subframe where CSI-RS transmission collides with a synchronization signal, PBCH (physical broadcast channel), and system information block type 1 (SystemInformationBlockType1) or a subframe where a paging message is transmitted. Further, in a set S, where S={15}, S={15, 16}, S={17, 18}, S={19, 20} or S={21, 22}, a resource element where a CSI-RS of one antenna port is transmitted is not used for transmission of a CSI-RS of another antenna port.

The table below shows an example of a configuration of a subframe where a CSI-RS is transmitted.

TABLE 8

| CSI-RS-SubframeConfig $I_{CSI-RS}$ | CSI-RS period $T_{CSI-RS}$ (subframe) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to the table above, depending on the CSI-RS subframe configuration ($I_{CSI-RS}$), the period ($T_{CSI-RS}$) of the subframe where CSI-RSs are transmitted and an offset ($\Delta_{CSI-RS}$) may be determined. The CSI-RS subframe configuration in the table above may be one of the 'SubframeConfig' field or 'ZeroTxPowerSubframeConfig' field of the CSI-RS-Config IE in Table 5. The CSI-RS subframe configuration may be separately made for non-zero power CSI-RSs and zero power CSI-RSs.

Meanwhile, resource elements used for CSI-RSs are illustrated when the CSI-RS configuration index is 0 in normal CP. Rp denotes a resource element used for CSI-RS transmission on antenna port p. Referring to the figure, CSI-RSs for antenna ports 15 and 16 are transmitted through the resource elements corresponding to the third subcarriers (subcarrier index 2) of the sixth and seventh OFDM symbols (OFDM symbol indexes 5 and 6) of the first slot. The CSI-RSs for antenna ports 17 and 18 are transmitted through resource elements corresponding to the ninth subcarriers (subcarrier index 8) of the sixth and seventh OFDM symbols (OFDM symbol indexes 5 and 6) of the first slot. The CSI-RSs for antenna ports 19 and 20 are transmitted through the same resource element where the CSI-RSs for antenna ports 15 and 16 are transmitted, and the CSI-RSs for antenna ports 21 and 22 are transmitted through the same resource element where the CSI-RSs for antenna ports 17 and 18 are transmitted.

When CSI-RSs are transmitted to the UE through eight antenna ports, the UE will receive RBs to which R15 to R22 are mapped. That is, the UE will receive a CSI-RS having a particular pattern.

Meanwhile, a small cell will be described hereinafter.

<Introduction of Small Cell>

Meanwhile, in a next-generation mobile communication system, it is expected that a small cell of which a cell coverage radius is small is added in the coverage of a legacy cell and that the small cell handles a greater amount of traffic. The legacy cell has a greater coverage than that of the small cell, and thus is also referred to as a macro cell. Hereinafter, it is described with reference to FIG. 11.

Figure 11:
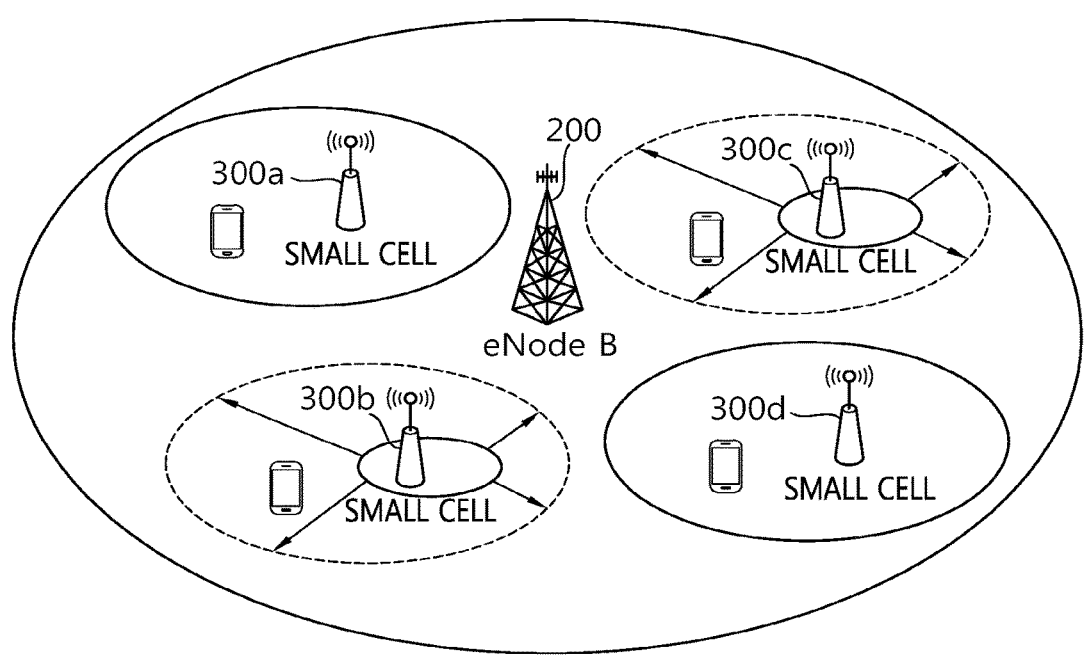
FIG. 11 illustrates a heterogeneous network environment in which a macro cell and a small cell co-exist and which is possibly used in a next-generation wireless communication system.

FIG. 11 Illustrates a Heterogeneous Network Environment in which a Macro Cell and a Small Cell Co-Exist and which is Possibly Used in a Next-Generation Wireless Communication System.

Referring to FIG. 11, it is shown a heterogeneous network environment in which a macro cell served by a legacy eNodeB 200 overlaps with a small cell served by one or more small eNodeBs 300a, 300b, 300c, and 300d. The legacy eNodeB provides a greater coverage than the small eNodeB, and thus is also called a macro eNodeB (MeNB). In the present specification, the macro cell and the MeNB may be used together. A UE having access to the macro cell 200 may be referred to as a macro UE. The macro UE receives a downlink signal from the MeNB, and transmits an uplink signal to the MeNB.

In such a heterogeneous network, coverage holes of the macro cell can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

Meanwhile, since small cells are deployed as described above, an inter-cell interference problem may become more serious. To solve this problem, as illustrated, a coverage size of the small cell may be decreased according to a situation. Alternatively, the small cell may be off and then on again according to the situation.

Figure 12:
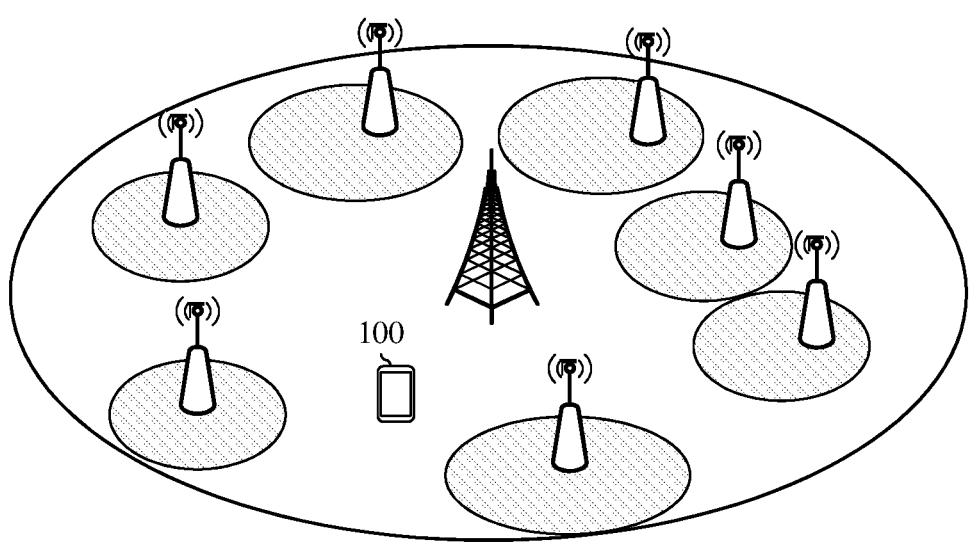
FIG. 12 illustrates an example of a situation in which a small cell is densely deployed.

FIG. 12 Illustrates an Example of a Situation in which a Small Cell is Densely Deployed.

Referring to FIG. 12, it is shown a situation in which a small cell is densely deployed in the coverage of a macro cell. In this situation, a UE 100 may have difficulty to detect the small cells within a short time. In particular, the aforementioned cell detection is performed through PSS/SSS reception. However, when a great number of small cells transmit the PSS/SSS at the same timing, i.e., on subframes #0 and #5, the UE 100 may have difficult to entirely receive it at once. Furthermore, when the small cells simultaneously transmit the PSS/SSS on the subframes #0 and #5, mutual interference occurs, which may cause difficulty for the UE 100 to receive it correctly.

<Disclosures of the Present Specification>

Accordingly, one disclosure of the present specification aims to provide a solution for the above problems.

Figure 13:
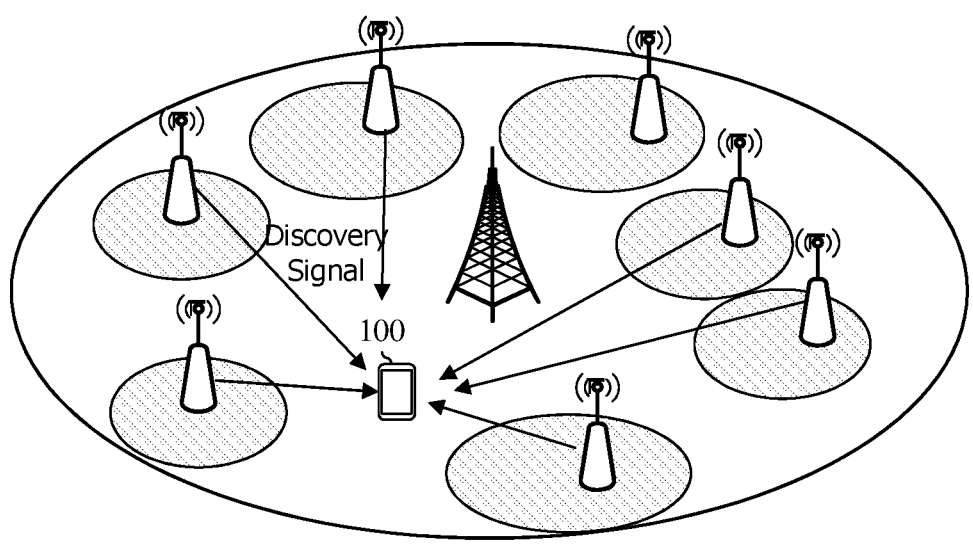
FIG. 13 illustrates an example of transmitting a discovery signal by a small cell according to one disclosure of the present specification.

FIG. 13 Illustrates an Example of Transmitting a Discovery Signal by a Small Cell According to One Disclosure of the Present Specification.

To solve the aforementioned problem, as can be seen from FIG. 13, one disclosure of the present specification proposes to transmit a new discovery signal (DS) in addition to the legacy PSS/SSS by a small cell so that a UE can effectively detect the small cells. The DS may also be called a discovery reference signal (DRS). Accordingly, the UE must perform a cell search procedure or a cell detection procedure by using the DS in addition to the legacy PSS/SSS.

Herein, the DS may imply a signal periodically transmitted with a long period.

The DS may also be transmitted by not only a small cell but also a remote radio head (RRH), a transmission point (TP), etc.

The DS may have the following feature.

More cells can be detected in comparison with the legacy PSS/SSS and CRS.

More cells can be detected within a short time, e.g., one subframe.

Measurement can be performed within a short time, e.g., one subframe.

Measurement is supported for a small cell performing an on/off operation.

The DS may be implemented with the following signals.

(a) PSS (or SSS) and CRS
(b) PSS (or SSS) and CSI-RS
(c) PSS (or SSS) and PRS
(d) combinations of options other than the above listed options The DS may be used for coarse time/frequency tracking and measuring.

Meanwhile, the DS must satisfy the following requirements.

The DS must support coarse time synchronization with assumption of a very high initial timing error (e.g., +−2.5 ms).

The DS must support coarse frequency synchronization with assumption of a very high initial frequency error (e.g., 20 KHz).

The DS must support the detection of at least three cells.

Meanwhile, a period of the DS is determined by considering the following constraints.

Multiple measurement gap periods: 40 msec, 80 msec, 160 msec, or 320 msec

Align with DRX cycle: 10, 20, 32, 40, 64, 80, 128, 160, 256, 320, 512, 640, 1024, 1280, 2048, 2560

If the PSS/SSS are transmitted as a part of the discovery signal, the period of the discovery signal must be a multiple of 5 msec, so that typical PSS/SSS transmitted in an on-state are replaced by the PSS/SSS of the discovery signal. However, this constraint may not be applied if the small cell does not transmit the discovery signal in the on-state. Alternatively, in order to minimize an influence of the legacy UE, not a UE improved according to the disclosure of the present specification, the PSS/SSS for the discovery signal may be additionally transmitted in addition to the legacy PSS/SSS. As such, the PSS/SSS additionally transmitted for the discovery signal in addition to the legacy PSS/SSS may also be called a DS-PSS (or DRS-PSS)/DS-SSS (or DRS-SSS). In this case, a cell ID based on the DS-PSS (or the DRS-PSS)/DS-SSS (or DRS-SSS) may be different from a cell ID based on the PSS/SSS.

On the other hand, if one or more of the CRS and the CSI-RS is additionally transmitted for the discovery signal in addition to the conventional CRS, the CRS and the CSI-RS may be called respectively a DS-CRS (or DRS-CRS) and a DS-CSI-RS (or DRS-CSI-RS). Further, if a PRS is additionally transmitted for the discovery signal other than the conventional PRS, the PRS may be called a DS-PRS (or DRS-PRS).

Meanwhile, when a discovery signal (DS or DRS) transmitted by a specific small cell is transmitted in the aforementioned operations (a) to (d), a sequence and resource of the DRS-PSS and the DRS-SSS may be configured as similar as possible to the legacy PSS and the SSS. However, a difference with the legacy PSS/SSS may lie in that it is transmitted on a different scrambling initial parameter and/or resource location (e.g., different frequency/time resources).

Respective signals (e.g., DRS-PSS, DRS-SSS, DRS-CRS, DRS-CSI-RS, and/or DRS-PRS) constituting the discovery signal may be all transmitted according to the same transmission period/offset. Alternatively, respective components may be transmitted according to different transmission periods/offsets. For example, this will be described with reference to FIG. 14.

Figure 14:
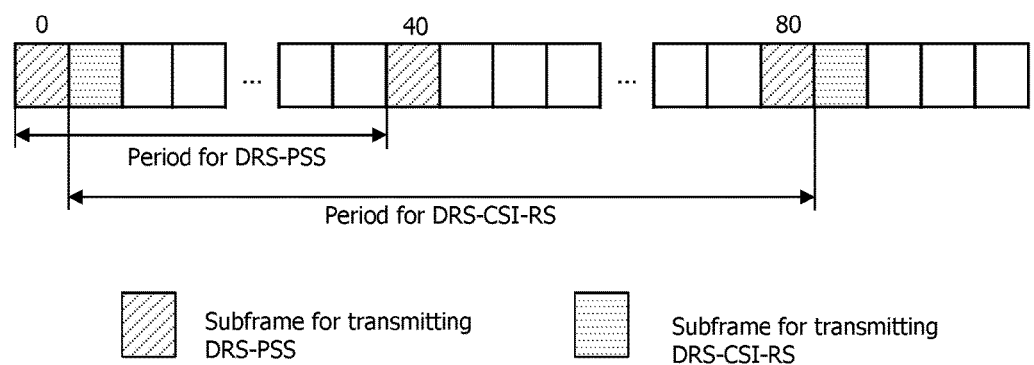
FIG. 14 illustrates an exemplary period of a discovery signal transmitted according to one disclosure of the present specification.

FIG. 14 Illustrates an Exemplary Period of a Discovery Signal Transmitted According to One Disclosure of the Present Specification.

As can be seen from FIG. 14, when the discovery signal includes a DRS-PSS (and/or DRS-SSS) and a DRS-CSI-RS, the DRS-PSS (and/or DRS-SSS) may be transmitted for example with a period of 40 msec, whereas the DRS-CSI-RS may be transmitted with a period of 80 msec.

The following description will focus on a method of configuring and transmitting the DRS-PSS and the DRS-SSS as a part of a discovery signal. It is apparent that this description is also applicable to other components of the discovery signal. For the discovery signal, 1) the DRS-PSS and the DRS-SSS may be both transmitted, or 2) only the DRS-PSS may be transmitted, or 3) only the DRS-SSS may be transmitted. The description of the present invention is also applicable to all of the above three cases.

I. Location Capable of Transmitting DRS-PSS and DRS-SSS Considering ON State.

A small cell may transmit a discovery signal both in an ON state and an OFF state. Due to transmission of a channel/signal or the like, a location of an OFDM symbol capable of transmitting a DRS-PSS and a DRS-SSS in the ON state is relatively restricted in comparison with a location of an OFDM symbol capable of performing transmission in an OFF state.

The following description is applicable to both a case where only the DRS-PSS or the DRS-SSS is transmitted between the DRS-PSS and the DRS-SSS or a case where both of the DRS-PSS and the DRS-SSS are transmitted. Further, it is also applicable to all cases where the DRS-PSS and/or DRS-PSS to be transmitted on multiple OFDM symbols are plural in number.

Although the following description focuses on a case where a normal CP is used in an FDD system, it is apparent that the similar principle is also applicable to a case where a TDD system or an extended CP is used.

1. Same Location with Legacy PSS and SSS

A DRS-PSS (DRS-SSS) may be transmitted on the same OFDM symbol location as the legacy PSS and the legacy SSS. In this case, the DRS-PSS (or DRS-SSS) must be transmitted by using the same RE source and sequence as the legacy PSS (or legacy SSS).

In this case, when the DRS-PSS (or DRS-SSS) is transmitted in a region other than subframes #0 and #5, there may be a problem in that the legacy UE recognizes this as the legacy PSS (legacy SSS).

2. Consideration of OFDM Symbol for Transmitting PDCCH, PSS, SSS, CRS, and PBCH

Transmission locations of a DRS-PSS and a DRS-SSS may be determined by considering transmission locations of a PDCCH, a PSS, an SSS, a CRS, and a PBCH. More specifically, this will be described with reference to FIG. 15.

Figure 15:
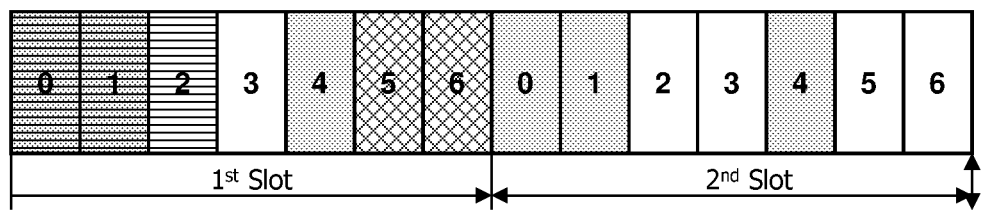
FIG. 15 illustrates a symbol on which a CRS, a primary synchronization signal (PSS)/secondary synchronization signal (SSS), and a physical downlink control channel (PDCCH) are transmitted according to one disclosure of the present specification.

FIG. 15 Illustrates a Symbol on which a CRS, a PSS/SSS, and a PDCCH are Transmitted According to One Disclosure of the Present Specification.

As can be seen from FIG. 15, when considering a case where a DRS-PSS and a DRS-SSS are transmitted in a subframe #0, the transmission locations of the DRS-PSS and the DRS-SSS may be determined by considering transmission locations of a PDCCH, a PSS, an SSS, and a CRS and an OFDM symbol location of a PBCH transmitted on OFDM symbols 0, 1, 2, and 3 in a second slot. In this case, an OFDM symbol 3 in a first slot and OFDM symbols 5 and 6 in the second slot may be determined as a symbol capable of transmitting the DRS-PSS and the DRS-SSS.

3. Consideration of OFDM Symbol for Transmitting PDCCH, PSS, SSS, and CRS

When considering a case where a DRS-PSS and a DRS-SSS are transmitted on a subframe #5, transmission locations of the DRS-PSS and the DRS-SSS may be determined by considering transmission locations of a PDCCH, a PSS, an SSS, and a DRS as shown in FIG. 15. In this case, an OFDM symbol 3 in a first slot and OFDM symbols 2, 3, 5, and 6 in a second slot may be considered as a symbol capable of transmitting the DRS-PSS and the DRS-SSS.

4. Consideration of OFDM Symbol for Transmitting PDCCH and CRS

When considering a case where a DRS-PSS and a DRS-SSS are not transmitted on subframes #0 and #5, transmission locations of the DRS-PSS and the DRS-SSS may be determined by considering transmission locations of PDCCH and CRS. In this case, OFDM symbols 3, 5, and 6 in a first slot and OFDM symbols 2, 3, 5, and 6 in a second slot may be considered as a symbol capable of transmitting the DRS-PSS and the DRS-SSS.

On the other hand, an OFDM symbol for transmitting a CSI-RS may be additionally considered.

A location of an OFDM symbol capable of transmitting the CSI-RS may be considered in addition to the OFDM symbol capable of transmitting the DRS-PSS and DRS-SSS considered in the above options 1, 2, 3, and 4. A location of an OFDM symbol capable of transmitting the CSI-RS is OFDM symbols 5 and 6 in a first slot and OFDM symbols 2, 3, 5, and 6 in a second slot in case of FDD, and is OFDM symbols 5 and 6 in a first slot and OFDM symbols 1, 2, 3, 5, and 6 in a second slot in case of TDD. Therefore, the DRS-PSS and the DRS-SSS may be transmitted through an OFDM symbol location by excluding the location of the OFDM symbol capable of transmitting the CSI-RS from the OFDM symbol locations considered in the options 1 to 4.

In this case, if the location of the OFDM symbol capable of transmitting the CSI-RS is excluded, there may be a problem in that the number of symbols capable of transmitting the DRS-PSS and the DRS-SSS is insufficient. For example, if a transmission location of the PDCCH, the PSS, the SSS, the CRS, and the PBCH and a transmission location of the CSI-RS are considered in an FDD system, only an OFDM symbol 3 in a first slot is a symbol location that can be used to transmit the DRS-PSS and the DRS-SSS. However, in this case, if it is intended to transmit both of the DRS-PSS and the DRS-SSS or if it is intended to decrease an influence of interference by varying a location of an OFDM symbol for transmitting the DRS-PSS and/or the DRS-SSS in each cell, the number of OFDM symbols capable of transmitting the DRS-PSS and the DRS-SSS is insufficient.

For this, it may be considered to transmit the DRS-PSS and the DRS-SSS through an OFDM symbol region in which the PDCCH can be transmitted. In this case, in order to transmit the DRS-PSS and the DRS-SSS in the OFDM symbol region in which the PDCCH can be transmitted, the number of OFDM symbols capable of transmitting the PDCCH may be restricted. For example, it may be restricted that the PDCCH is transmitted through maximum one OFDM symbol or maximum two OFDM symbols on a subframe for transmitting the DRS-PSS and the DRS-SSS. Accordingly, the number of OFDM symbols capable of transmitting the DRS-PSS and the DRS-SSS may be increased. However, there may be a situation where a transmission region of an OFDM symbol for transmitting a PDCCH recognized by a UE (through a PCFICH) overlaps with a transmission region of the DRS-PSS and the DRS-SSS. In this case, the UE may perform the following operation.

If the OFDM symbol region for transmitting the PDCCH (recognized through the PCFICH) overlaps with an OFDM symbol region for transmitting the DRS-PSS and the DRS-SSS, the UE may first transmit the DRS-PSS and the DRS-SSS. For this, as to an overlapping RE region among transmission regions of the PDCCH and the DRS-PSS and DRS-SSS, the UE may assume that the PDCCH is punctured and the DRS-PSS and the DRS-SSS are transmitted.

If the OFDM symbol region for transmitting the PDCCH recognized through the PCFICH overlaps with the transmission region of the DRS-PSS and the DRS-SSS, the UE may decide that a value received from the PCFICH has an error. That is, it may be decided that an error occurs in PCFICH reception, and reception of the DRS-PSS and the DRS-SSS may be performed in a region in which the OFDM symbol region for transmitting the PDCCH overlaps with the transmission region of the DRS-PSS and the DRS-SSS.

If the OFDM symbol region for transmitting the PDCCH (recognized through the PCFICH) overlaps with the transmission region of the DRS-PSS and the DRS-SSS, the UE may assume that the DRS-PSS and the DRS-SSS are not transmitted in a corresponding subframe or in a corresponding OFDM symbol. That is, it may be decided that the PCFICH is correctly detected and it may be regarded that the PDCCH will be transmitted in a corresponding OFDM symbol region, and thus reception of the DRS-PSS and the DRS-SSS may not be performed in a corresponding subframe or a corresponding OFDM symbol.

II. Method of Determining Transmission Location of DRS-PSS and DRS-SSS

A DRS-PSS and/or a DRS-SSS may be transmitted through an OFDM symbol location determined as described above. If the DRS-PSS and the DRS-SSS are both transmitted, the DRS-PSS and the DRS-SSS may be both transmitted on a new location at which the legacy PSS and the legacy SSS are not transmitted, or only the DRS-PSS (or on the contrary, DRS-SSS) may be transmitted on a new OFDM symbol location described in the above section I and the DRS-SSS (or on the contrary, DRS-PSS) may be transmitted on an OFDM symbol location at which the legacy SSS (legacy PSS) is transmitted. If only the DRS-PSS (or on the contrary, DRS-SSS) is transmitted between the DRS-PSS and the DRS-SSS as a discovery signal (DS or DRS), the DRS-PSS (or on the contrary, DRS-SSS) may be transmitted on a new OFDM symbol location described above, or may be transmitted on an OFDM symbol location at which the legacy PSS (legacy SSS) is transmitted.

1. In Case of Transmitting Only DRS-PSS (DRS-SSS)

Only a DRS-PSS (or on the contrary, DRS-SSS) may be transmitted as a discovery signal between the DRS-PSS and the DRS-SSS, and the DRS-PSS (or on the contrary, DRS-SSS) may be transmitted on a new OFDM symbol mentioned in the above section I. In this case, a DRS-PSS (or DRS-SSS) of a specific cell may be transmitted on one of new OFDM symbol locations mentioned in the above section I. Alternatively, the DRS-PSS (or DRS-SSS) may be transmitted on a different OFDM symbol location in each cell. In case of transmitting on the different OFDM symbol location in each cell, in particular, an OFDM symbol location on which the DRS-PSS (DRS-SSS) is transmitted may be determined by $N_{ID}^{(1)}$ and/or $N_{ID}^{(2)}$ or a cell ID of a cell for transmitting the DRS-PSS (or DRS-SSS).

2. In Case of Transmitting DRS-PSS and DRS-SSS 2-1. In Case of Transmitting Both of DRS-PSS and DRS-SSS on New OFDM Symbol Location If a DRS-PSS and a DRS-SSS are both transmitted as a discovery signal, the DRS-PSS and the DRS-SSS may be transmitted on a new OFDM symbol location mentioned in the above section I. In this case, a DRS-PSS and DRS-SSS of a specific cell may be transmitted through one of new OFDM symbol locations mentioned in the above section I. Alternatively, the DRS-PSS and the DRS-SSS may be transmitted on a different OFDM symbol location in each cell. The OFDM symbol location on which the DRS-PSS and the DRS-SSS are transmitted may be determined by $N_{ID}^{(1)}$ and/or $N_{ID}^{(2)}$ or a cell ID of a cell for transmitting the DRS-PSS and the DRS-SSS transmitted on the different OFDM symbol location in each cell.

2-2. In Case of Transmitting Only DRS-PSS (or DRS-SSS) on New OFDM Symbol Location A DRS-SSS and a DRS-SSS may be both transmitted as a discovery signal, whereas only the DRS-PSS (or DRS-SSS) may be transmitted on a new OFDM symbol location mentioned in the above section I and the DRS-SSS (or DRS-PSS) may be transmitted on an OFDM symbol location on which the legacy SSS (or legacy PSS) is transmitted. In this case, the location of the OFDM symbol on which the DRS-SSS (or DRS-PSS) is transmitted may be determined by $N_{ID}^{(1)}$ and/or $N_{ID}^{(2)}$ or a cell ID of a cell for transmitting the DRS-PSS and the DRS-SSS to decrease an influence of interference having an effect on the DRS-SSS (or DRS-PSS) by another cell. That is, for example, although an OFDM symbol location of the DRS-PSS (DRS-SSS) is the same as the location of the legacy PSS (or legacy SSS), the OFDM symbol location of the DRS-SSS (or DRS-PSS) may be determined by $N_{ID}^{(2)}$. In case of an FDD system using a normal CP, an OFDM symbol region for transmitting a DRS-SSS (or DRS-PSS) in a specific cell may be determined for example as follows.

Among locations of OFDM symbols capable of transmitting the DRS-SSS (or DRS-PSS), a location of an OFDM symbol for transmitting a DRS-SSS (or DRS-PSS) of a specific cell may be determined randomly. A UE may blindly detect a candidate OFDM symbol location capable of transmitting the DRS-SSS (DRS-PSS).

ii) Among locations of OFDM symbols capable of transmitting the DRS-SSS (or DRS-PSS), a location of an OFDM symbol for transmitting a DRS-SSS (or DRS-PSS) of a specific cell may be determined by $N_{ID}^{(1)}$. For example, the DRS-SSS (or DRS-PSS) may be transmitted on an OFDM symbol 1 in a second slot if a value of $N_{ID}^{(1)}$ mod 3 is 0, an OFDM symbol 2 of the second slot if a value of $N_{ID}^{(1)}$ mod 3 is 1, and an OFDM symbol 3 of the second slot if a value of $N_{ID}^{(1)}$ mod 3 is 2.

Among locations of OFDM symbols capable of transmitting the DRS-SSS (or DRS-PSS), a location of an OFDM symbol for transmitting a DRS-SSS (or DRS-PSS) of a specific cell may be determined by $N_{ID}^{(2)}$. For example, the DRS-SSS (or DRS-PSS) may be transmitted on an OFDM symbol 1 in a second slot if a value of $N_{ID}^{(2)}$ mod 3 is 0, an OFDM symbol 2 of the second slot if a value of $N_{ID}^{(2)}$ mod 3 is 1, and an OFDM symbol 3 of the second slot if a value of $N_{ID}^{(2)}$ mod 3 is 2.

Among the transmission methods described in the above section II, a transmission method applicable to a case where the DRS-PSS and the DRS-SSS are both transmitted is also applicable to a case where multiple DRS-PSSs are transmitted. When two DRS-PSSs are transmitted as a discovery signal and the two DRS-PSSs are respectively a DRS-PSS-1 and a DRS-PSS-2, in the above description, a location at which the DRS-PSS is transmitted may be regarded as a location at which the DRS-PSS-1 is transmitted, and a location at which the DRS-SSS is transmitted may be regarded as a location at which the DRS-PSS-2 is transmitted.

The aforementioned embodiments of the present invention can be implemented through various means. For example, the embodiments of the present invention can be implemented in hardware, firmware, software, combination of them, etc. Details thereof will be described with reference to the drawing.

Figure 16:
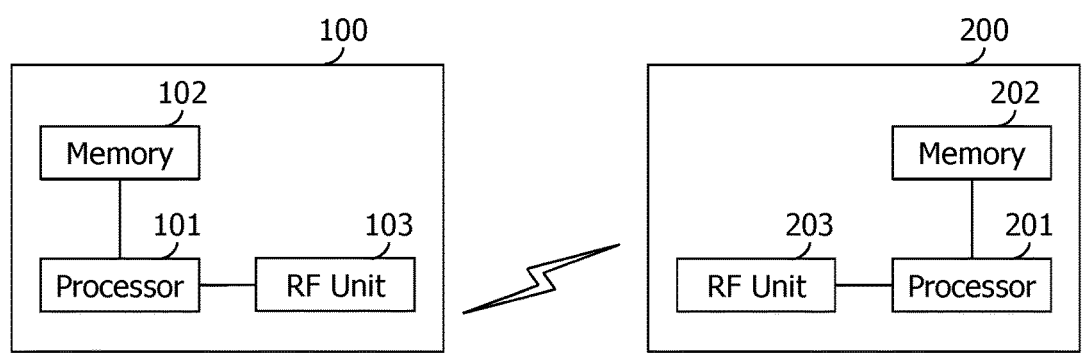
FIG. 16 is a block diagram of a wireless communication system according to an embodiment of the present invention.

FIG. 16 is a Block Diagram of a Wireless Communication System According to an Embodiment of the Present Invention.

An eNodeB 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the eNodeB may be implemented by the processor 201.

An MTC device 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving a discovery signal in a wireless communication system which includes a macro cell and a small cell located on the macro cell, the method performed by a user equipment (UE) and comprising:
    checking, through a physical control format indicator channel (PCFICH) received from the small cell on a first orthogonal frequency division multiplexing (OFDM) symbol in a downlink subframe, a location of at least one OFDM symbol of plural OFDM symbols on which a downlink control channel is received; and
    determining a resource region, on which the discovery signal is received from the small cell, in the downlink subframe,
    wherein, if the UE determines that the resource region on which the discovery signal is received is overlapped with one of the OFDM symbols on which the downlink control channel is received, the downlink control channel is punctured and the discovery signal is received on the resource region.

2. The method of claim 1, wherein if the resource region on which the discovery signal is received is present in the downlink subframe, a number of the OFDM symbols on which the downlink control channel is received are restricted to a maximum of two.

3. The method of claim 1, wherein the discovery signal contains a primary synchronization signal (PSS) and a secondary synchronization signal (SSS).

4. A user equipment (UE) for receiving a discovery signal in a wireless communication system which includes a macro cell and a small cell located on the macro cell, the UE comprising
    a radio frequency (RF) transceiver transmitting and receiving radio signals; and
    a processor operatively connected to the RF transceiver, wherein the processor:
        checks, through a physical control format indicator channel (PCFICH) received from the small cell on a first orthogonal frequency division multiplexing (OFDM) symbol in a downlink subframe, a location of at least one OFDM symbol of plural OFDM symbols on which a downlink control channel is received; and
        determines a resource region, on which the discovery signal is received from the small cell, in the downlink subframe,
        wherein if the UE determines that the resource region on which the discovery signal is received is overlapped with one of the OFDM symbols on which the downlink control channel is received, the downlink control channel is punctured and the discovery signal is received on the resource region.

5. The UE of claim 4, wherein if the resource region on which the discovery signal is received is present in the downlink subframe, a number of the OFDM symbols on which the downlink control channel is received are restricted to a maximum of two.

6. The UE of claim 4, wherein the discovery signal contains a primary synchronization signal (PSS) and a secondary synchronization signal (SSS).

* * * * *